United States Patent
Park

(10) Patent No.: US 6,374,127 B1
(45) Date of Patent: Apr. 16, 2002

(54) POWER SUPPLY APPARATUS AND METHOD FOR CONTROLLING SAME IN A MOBILE COMMUNICATION TERMINAL

(75) Inventor: Jae-Sun Park, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/263,472

(22) Filed: Mar. 5, 1999

(30) Foreign Application Priority Data

Mar. 5, 1998 (KR) .............................................. 98-7288

(51) Int. Cl.$^7$ ................................................. H04B 1/38
(52) U.S. Cl. ........................ 455/572; 455/550; 455/574
(58) Field of Search .............................. 455/572, 574, 455/573, 550, 136, 138, 240.1, 245.1, 247.1, 250.1, 232.1, 126, 38.3; 320/140; 370/311

(56) References Cited

U.S. PATENT DOCUMENTS

| | | | | |
|---|---|---|---|---|
| 4,684,870 A | * | 8/1987 | George et al. | 320/140 |
| 5,469,115 A | * | 11/1995 | Peterzell et al. | 320/129 |
| 5,471,654 A | * | 11/1995 | Okazaki et al. | 455/126 |
| 5,659,582 A | * | 8/1997 | Kojima et al. | 375/345 |
| 5,666,355 A | * | 9/1997 | Huah et al. | 370/311 |
| 6,141,568 A | * | 10/2000 | Sakaguchi | 455/566 |
| 6,169,449 B1 | * | 1/2001 | Hasagawa et al. | 330/51 |

* cited by examiner

Primary Examiner—Dwayne Bost
Assistant Examiner—Sonny Trinh

(74) Attorney, Agent, or Firm—Dilworth & Barrese, LLP

(57) ABSTRACT

A power supply apparatus for a mobile communication terminal having voltage regulators, a receiver and baseband signal processor, a transmitter, a power amplifier, and a DC/DC converter for converting a DC voltage from a battery. In a reception mode of the mobile communication terminal, the power supply apparatus regulates the DC voltage converted by the DC/DC converter and supplies the regulated DC voltage to the receiver and baseband signal processor. In a transmission mode, the power supply apparatus converts the DC voltage to a DC voltage corresponding to a transmission AGC (Automatic Gain Control) voltage which is determined based on a transmission power. The converted DC voltage is then supplied to the receiver and baseband signal processor, the transmitter, and the power amplifier via the voltage regulators. The power supply apparatus has a single DC/DC converter and adaptively varies the output voltage of the DC/DC converter according to the transmission power in the transmission mode. A method is also provided for controlling a power supply voltage in a communication terminal capable of operating in a reception mode and in a transmission mode. The method comprises the steps of regulating a DC voltage converted by a DC/DC converter and supplying the regulated DC voltage to the receiver and baseband signal processor in the reception mode; and converting the DC voltage converted by the DC/DC converter to a DC voltage corresponding to a transmission AGC voltage determined according to a transmission power and supplying the converted DC voltage to the receiver and baseband signal processor, the transmitter, and the power amplifier in the transmission mode.

11 Claims, 5 Drawing Sheets

POWER SUPPLY APPARATUS AND METHOD FOR CONTROLLING SAME IN A MOBILE COMMUNICATION TERMINAL

BACKGROUND

1. Field of the Invention

The present invention relates to a power supply apparatus and method for controlling same in a mobile communication terminal, and in particular, to a power supply apparatus and method for controlling a power supply voltage supplied therefrom where the power supply apparatus and method provide a reduction in size and an increase in power efficiency of the mobile communication terminal.

2. Description of the Related Art

A mobile communication terminal, such as a CDMA (Code Division Multiple Access) terminal and a GSM (Global System for Mobile communication) terminal, generally includes a rechargeable battery for providing the mobile communication terminal with a power supply voltage. A power supply apparatus connected to the rechargeable battery typically includes DC/DC converters for converting a DC voltage provided by the battery to several operating voltages for each part of the mobile communication terminal.

FIG. 1 illustrates a prior art power supply apparatus for a mobile communication terminal. The power supply apparatus down-converts (or steps down) a DC voltage of 7.2V provided from a battery 10 to a DC voltage of 3.9V for a receiver and baseband signal processor 30 and to a DC voltage of 5.0V for a transmitter and power amplifier 40. The prior art power supply apparatus includes a DC/DC converter 18 for converting the DC voltage of 7.2V supplied from the battery 10 to the DC voltage of 3.9V for the receiver and baseband signal processor 30, and a DC/DC converter 22 for converting the DC voltage of 7.2V supplied from the battery 10 to the DC voltage of 5.0V for the transmitter and power amplifier 40. The DC voltage output from the DC/DC converter 22 is provided to the transmitter and power amplifier 40 by way of a switch SW. The switch SW ensures that the converted DC voltage output from the DC/DC converter 22 is provided to the transmitter and power amplifier 40 only in a transmission mode and not in a reception mode. This reduces the power consumption in the reception mode. Hence, the mobile communication terminal reduces the overall power consumption and extends the life of the battery.

The prior art power supply apparatus as illustrated by FIG. 1 includes two DC/DC converters. Consequently, a reduction in size of the mobile communication terminal is compromised.

A need therefore exists for a power supply apparatus for a mobile communication terminal which has one DC/DC converter for providing a reduction in size of the mobile communication terminal.

Further, a need exists to provide a power supply apparatus and method for controlling a power supply voltage supplied therefrom in a mobile communication terminal for maximizing power efficiency of the mobile communication terminal and extending the life of a battery connected to the power supply apparatus.

SUMMARY

A power supply apparatus for a mobile communication terminal is provided having voltage regulators, a receiver and baseband signal processor, a transmitter, a power amplifier, and a DC/DC converter for converting a DC voltage from a battery. In a reception mode of the mobile communication terminal, the power supply apparatus regulates the DC voltage converted by the DC/DC converter and supplies the regulated DC voltage to the receiver and baseband signal processor. In a transmission mode, the power supply apparatus converts the DC voltage converted by the DC/DC converter to a DC voltage corresponding to a transmission AGC (Automatic Gain Control) voltage which is determined based on a transmission power. The converted DC voltage is then supplied to the receiver and baseband signal processor, the transmitter, and the power amplifier via the voltage regulators.

The power supply apparatus has a single DC/DC converter and adaptively varies the output voltage of the DC/DC converter according to the transmission power in the transmission mode. Accordingly, the power supply apparatus of the present invention provides for a reduction in size of the mobile communication terminal. Further, the power supply apparatus of the present invention provides for a reduction in the amount of power loss by the voltage regulators and the power amplifier, thereby maximizing power efficiency and extending the life of the battery.

A method is also provided for controlling a power supply voltage in a mobile communication terminal capable of operating in a reception mode and in a transmission mode. The mobile communication terminal having a power supply apparatus including a receiver and baseband signal processor, a transmitter, a power amplifier, and a DC/DC converter. The DC/DC converter converts a DC voltage supplied by a battery. The method comprises the steps of regulating the DC voltage converted by the DC/DC converter and supplying the regulated DC voltage to the receiver and baseband signal processor in the reception mode of the mobile communication terminal; and converting the DC voltage converted by the DC/DC converter to a DC voltage corresponding to a transmission AGC (Automatic Gain Control) voltage determined according to a transmission power and supplying the converted DC voltage to the receiver and baseband signal processor, the transmitter, and the power amplifier in the transmission mode of the mobile communication terminal.

DETAILED DESCRIPTION OF PREFERRED EMBODIMENTS

Figure 1:
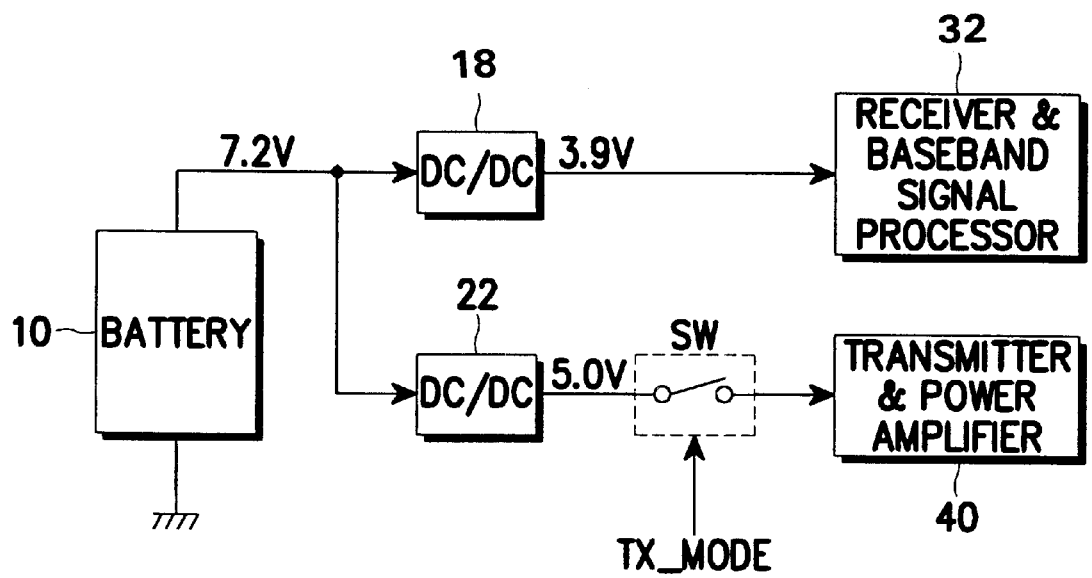
FIG. 1 is a schematic diagram of a prior art power supply apparatus for a mobile communication terminal.

It is to be understood that in the following description of a preferred embodiment specific details are set forth to provide a more thorough understanding of the present invention, notwithstanding that one skilled in the art may practice the invention without these specific details. It is to be further understood that in the accompanying drawings, similar reference numerals are used to denote elements having similar or equivalent constructions. In the following description, well known functions or constructions may not be described in detail since they would obscure the invention in unnecessary detail.

Figure 2:
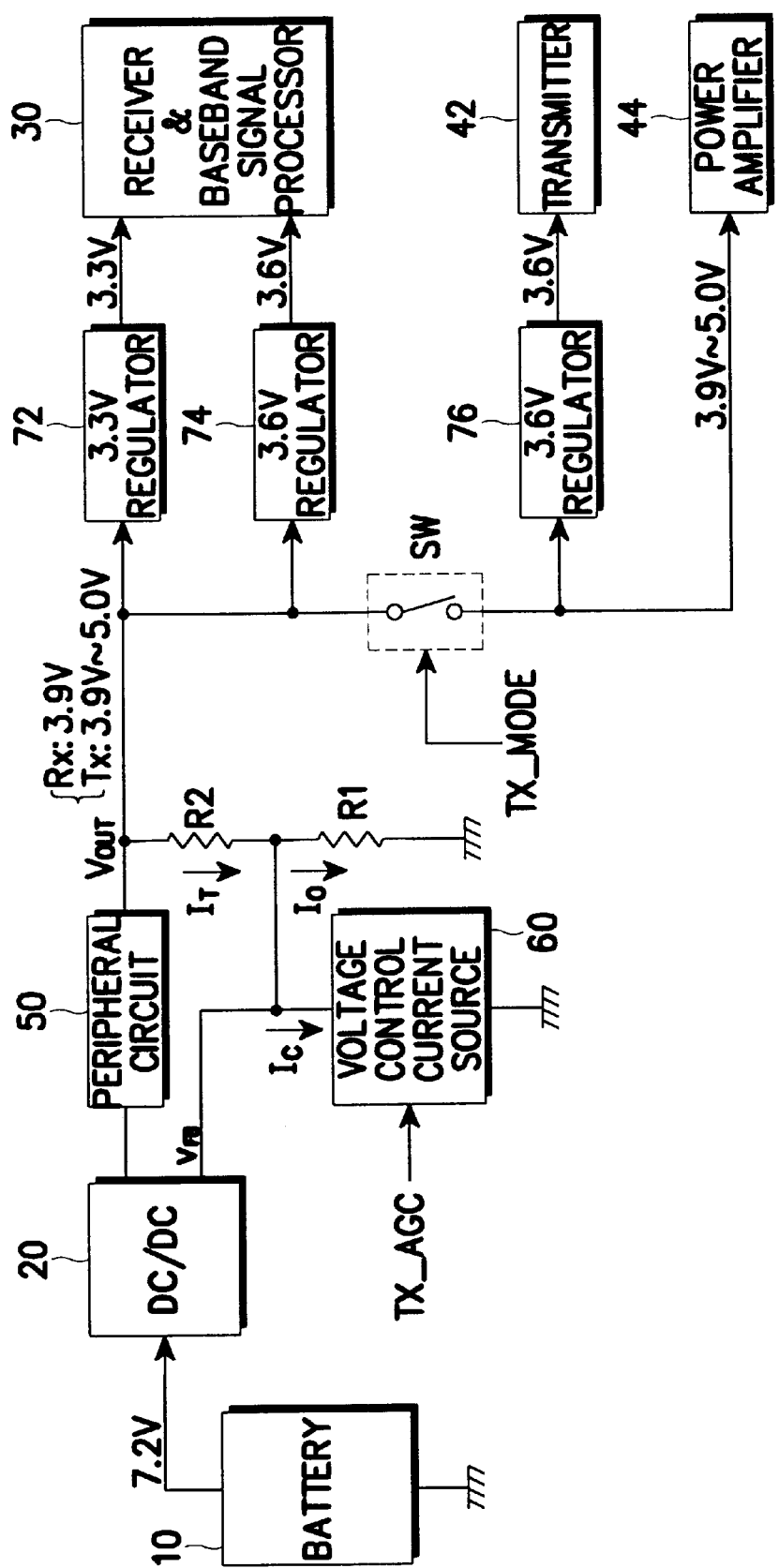
FIG. 2 is a schematic diagram of a power supply apparatus for a mobile communication terminal in accordance with the present invention.

With reference to FIG. 2, there is illustrated a schematic diagram of a power supply apparatus for a mobile communication terminal in accordance with the present invention. The power supply apparatus of the present invention down-converts a DC voltage supplied from a rechargeable battery 10 and provides the down-converted DC voltage to respective elements of the mobile communication terminal. In contrast to the prior art power supply apparatus of FIG. 1, the novel power supply apparatus employs a single DC/DC converter 20, thereby contributing to a reduction in size of the mobile communication terminal. Additionally, the power supply apparatus of the present invention maximizes power efficiency of the mobile communication terminal by adaptively controlling the power supply voltage, as further described below.

In a typical prior art power supply apparatus as shown by FIG. 1, in a transmission mode, the power supply apparatus provides a constant DC voltage of 5V to a receiver and baseband signal processor 32, and a transmitter and a power amplifier 40. Accordingly, regulators which can normally operate even with a DC voltage of 3.9V, may cause a unnecessary power consumption.

Meanwhile, a transmitter of a mobile communication terminal employing PSK (Phase Shift Keying) modulation uses a class A or class AB power amplifier for linear amplification. Power efficiency of such a linear power amplifier is abruptly decreased, as the output power becomes lower than a saturation output power. Supplying the constant DC voltage to this power amplifier may additionally decrease the power efficiency. For example, in an IS-95 CDMA communication terminal, a transmission power at an antenna port is controlled in the 82 dB range between −50 dBm and 32 dBm. When a power amplifier with a saturation output power of 32 dBm outputs a power below 0 dBm, the power efficiency is 10% at the most. In other words, for the saturation output power, it is preferable that the power amplifier should be provided with the DC voltage of 5.0V as an operating voltage. However, when outputting the power below 0 dBm, it is permissible to provide the power amplifier with a DC voltage lower than 5.0V as an operating voltage.

The power supply apparatus in accordance with the present invention adaptively varies the operating voltage from 3.9V to 5.0V in proportion to the output power in the transmission mode, instead of supplying the constant operating voltage of 5.0V. As a result, when the transmission power is low, the power supply apparatus decreases the output voltage of the DC/DC converter 20 to reduce a relative voltage difference between the DC/DC converter 20 and respective regulators 72, 74, 76, and thus provides the power amplifier with a low voltage.

With continued reference to FIG. 2, the battery 10 provides a DC voltage of 7.2V. The DC/DC converter 20 has an input end, an output end and a feedback end. The input end receives the DC voltage from the battery 10, the output end is connected to a peripheral circuit 50, and the feedback end outputs a constant DC voltage $V_{FB}$. A resistor R2 is connected between an output end of the peripheral circuit 50 and the feedback end of the DC/DC converter 20, and a resistor R1 is connected between the feedback end and the ground.

A device suitable for use as the DC/DC converter 20 is model LTC1265 step-down DC/DC converter available from Linear Technology Co. Preferably, the DC/DC converter 20 outputs the DC voltage $V_{FB}$ of 1.25V at the feedback end. Accordingly, the DC/DC converter 20 outputs an output voltage $V_{OUT}$ determined by the following equation:

$$V_{OUT}=V_{BF}(1+R2/R1)=1.25\times(1+R2/R1) \text{ [V]} \quad (1)$$

It can be understood from equation (1) that the output voltage $V_{OUT}$ depends on resistance of the resistors R1 and R2.

A voltage control current source 60 is connected in parallel with the resistor R1 between the feedback end of the DC/DC converter 20 and the ground. The voltage control current source 60 receives a transmission automatic gain control (TX_AGC) voltage which is variable according to the transmission power, and controls a current $I_C$ depending on the value of the received TX_AGC voltage. Variation of the current $I_C$ will change a current IT flowing through the resistor R2, thereby varying the output voltage $V_{OUT}$ of the DC/DC converter 20.

For further describing the operation of the power control apparatus in accordance with the present invention, it is assumed that the mobile communication terminal requires the output voltage $V_{OUT}$ be 3.9V in the reception mode and the output voltage $V_{OUT}$ be 3.9–5.0V in the transmission mode.

Figure 3:
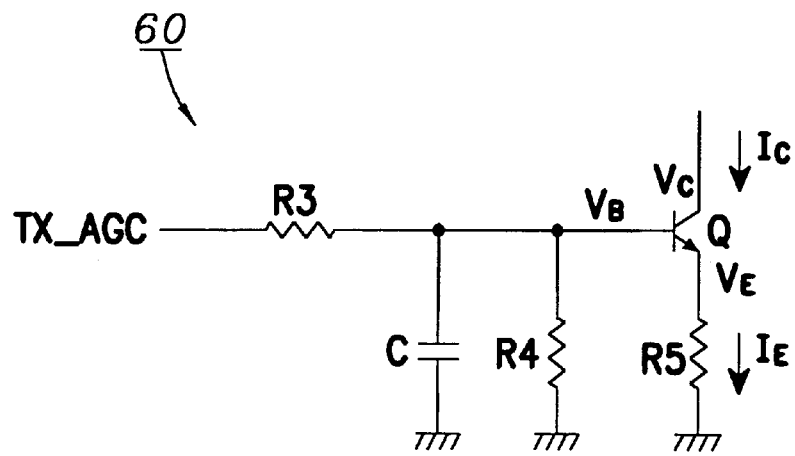
FIG. 3 is a schematic diagram of a power voltage control current source of FIG. 2.

In conjunction with reference to FIGS. 2 and 3, a detailed description will now be provided on how the power supply apparatus provides the mobile communication terminal with the constant DC voltage of 3.9V in the reception mode and the variable DC voltage of 3.9–5.0V in the transmission mode.

In the reception mode of the mobile communication terminal, the voltage $V_{OUT}$ of 3.9V is applied in common to voltage regulators 72 and 74. A switch SW is turned off (or opened) in response to an inactivated transmission mode signal TX_MODE in order for the output voltage $V_{OUT}$ not to be provided to a voltage regulator 76 and the power amplifier 44. The voltage regulators 72 and 74 regulate the voltage $V_{OUT}$ into DC voltages 3.3V and 3.6V, respectively, and supply the regulated voltages to the receiver and baseband signal processor 30.

In the transmission mode of the mobile communication terminal, the output voltage $V_{OUT}$ of 3.9–5.0V is applied to the voltage regulator 76 and the power amplifier 44. The output voltage $V_{OUT}$ of 3.9–5.0V is also applied to voltage regulators 72 and 74, because the switch SW is turned on (or closed) in response to the activated transmission mode signal TX_MODE. The voltage regulator 76 regulates the voltage $V_{OUT}$ of 3.9–5.0V into a DC voltage 3.6V and provides the regulated DC voltage to the transmitter 42. Further, the voltage $V_{OUT}$ of 3.9–5.0V is supplied to the power amplifier 44 as an operating voltage, through the switch SW. That is, in the transmission mode, the voltage $V_{OUT}$ of 3.9–5.0V is supplied to the receiver and baseband signal processor 30, the transmitter 42, and the power amplifier 44.

Referring to FIG. 3, the voltage control current source 60 includes a transistor Q, being a switching element, which is switchable according to the received TX_AGC voltage. The transistor Q has a base connected to the TX_AGC voltage through a resistor R3, a collector connected to the feedback end of the DC/DC converter 20, and an emitter connected to the ground through a resistor R5. Between the base of the transistor Q and the ground, a resistor R4 and a capacitor C are connected in parallel to each other.

The TX_AGC voltage is zero in the reception mode, and increases in proportion to the transmission power in the transmission mode. In the IS-95 CDMA communication terminal, the transmission power at the antenna port is controlled in the 82 dB range between −50 dBm and 32 dBm as shown in FIG. 4B, so that the TX_AGC voltage corresponding to this power range is 0.5–2.7V.

In the reception mode, the voltage control current source 60 receives the TX_AGC voltage of 0V, so that transistor Q is turned off, thereby cutting off the collector current $I_C$ (i.e., $I_C$=0). At this moment the output voltage $V_{OUT}$ of the DC/DC converter 20 is determined by equation (1).

Figure 4A:
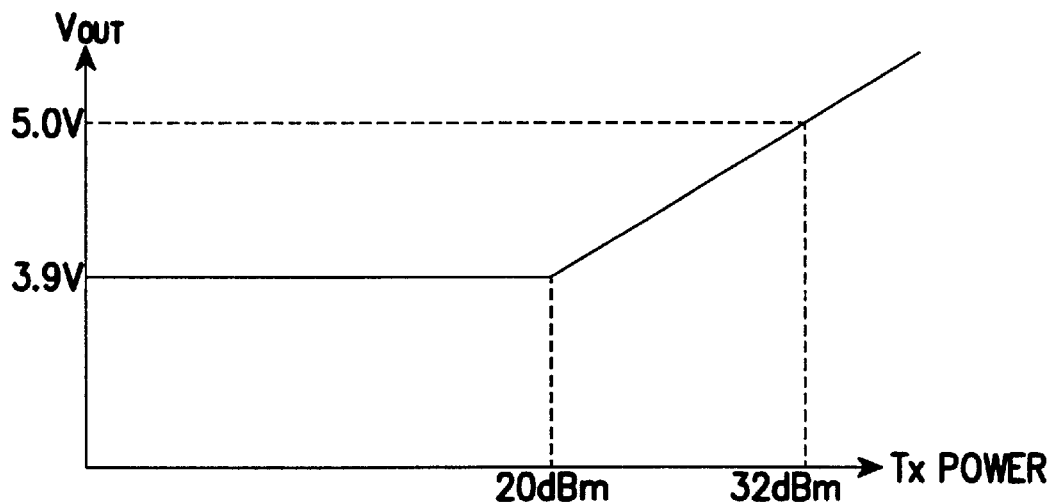
FIGS. 4A through 4C are charts illustrating output characteristics of a power amplifier of the power supply apparatus of FIG. 2.
Figure 4B:
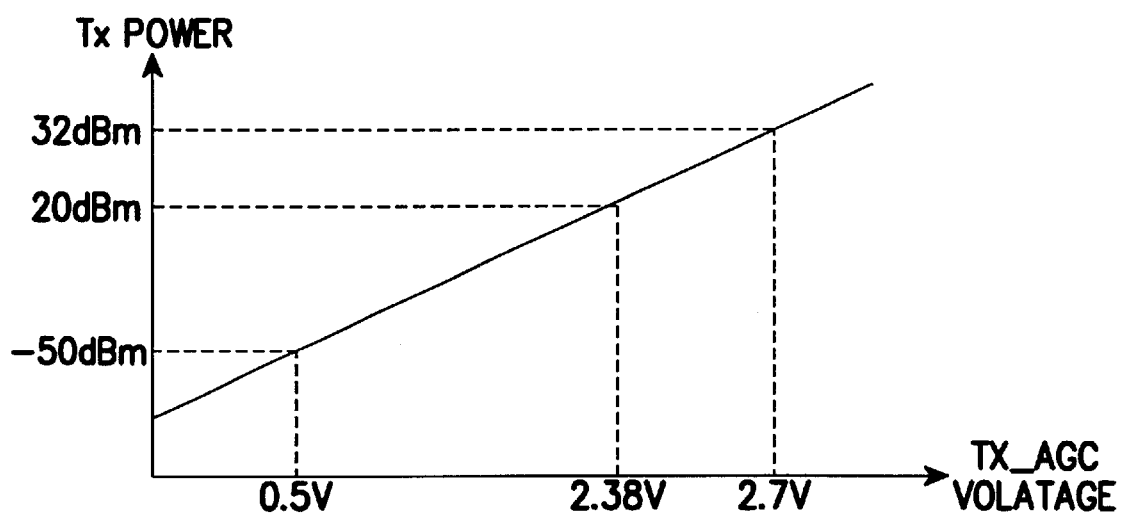

In the transmission mode, the voltage control current source 60 receives the TX_AGC voltage which varies according to the transmission power as shown in FIG. 4B. If a base voltage $V_B$ increases beyond 0.7V or emitter voltage $V_E$, the transistor Q is turned on. In this case, an emitter current $I_E$ is defined as follows:

$$I_E = V_E/R5 \text{ [A]} \quad (2)$$

Since a base current is negligible, the collector current $I_C$ is substantially identical to the emitter current $I_E$. Thus, the collector current $I_C$ can be written as follows:

$$I_C = V_E/R5 \text{ [A]} \quad (3)$$

When the TX_AGC voltage is $V_{AGC}$, the emitter voltage $V_E$ is defined as follows:

$$V_E = \{V_{AGC} \times R4/(R3+R4)\} - 0.7 \text{ [V]} \quad (4)$$

By substituting equation (4) for $V_E$ in equation (3), the collector current $I_C$ can be rewritten as follows:

$$I_C = \{\{V_{AGC} \times R4/(R3+R4)\} - 0.7\}/R5 \text{ [A]} \quad (5)$$

It can be appreciated from equation (5) that the collector current $I_C$ of the transistor Q depends on the TX_AGC voltage $V_{AGC}$. Furthermore, in the transmission mode, the output voltage $V_{OUT}$ of the DC/DC converter 20 is the sum of the feedback voltage $V_{FB}$ and the voltage drop across the resistor R2, and can be represented by the following equation:

$$V_{OUT} = V_{FB} + I_T \times R2 \text{ [V]} \quad (6)$$

Further, the current $I_T$ is the sum of the current $I_O$ and $I_C$ and can be written as follows:

$$I_T = I_C + I_O = I_C + V_{FB}/R1 \text{ [A]} \quad (7)$$

If equation (7) is substituted for $I_T$ in equation (6), the voltage $V_{OUT}$ can be rewritten as follows:

$$\begin{aligned}V_{OUT} &= V_{FB} + (I_C + V_{FB}/R1) \times R2 \\ &= V_{FB} \times (1 + R2/R1) + I_C \times R2 \\ &= 1.25 \times (1 + R2/R1) + I_C \times R2 \text{ [V]}\end{aligned} \quad (8)$$

As a result, it is apparent from equation (8) that the output voltage $V_{OUT}$ is a function of the current $I_C$ which depends on the TX_AGC voltage $V_{AGC}$ as shown in equation (5). Therefore, when the TX_AGC voltage $V_{AGC}$ is low (i.e., when the transmission power is low), the output voltage $V_{OUT}$ of the DC/DC converter 20 decreases. Accordingly, the power loss of the voltage regulators 72, 74, 76 is reduced, as well as the power consumption of the power amplifier 44 which usually consumes the most power in a mobile communication terminal. A reduction in power loss is possible and consequently, an extension of the battery's life, since the novel power supply apparatus adaptively varies the output voltage of the DC/DC converter 20 according to the transmission power in the transmission mode.

Figure 4C:
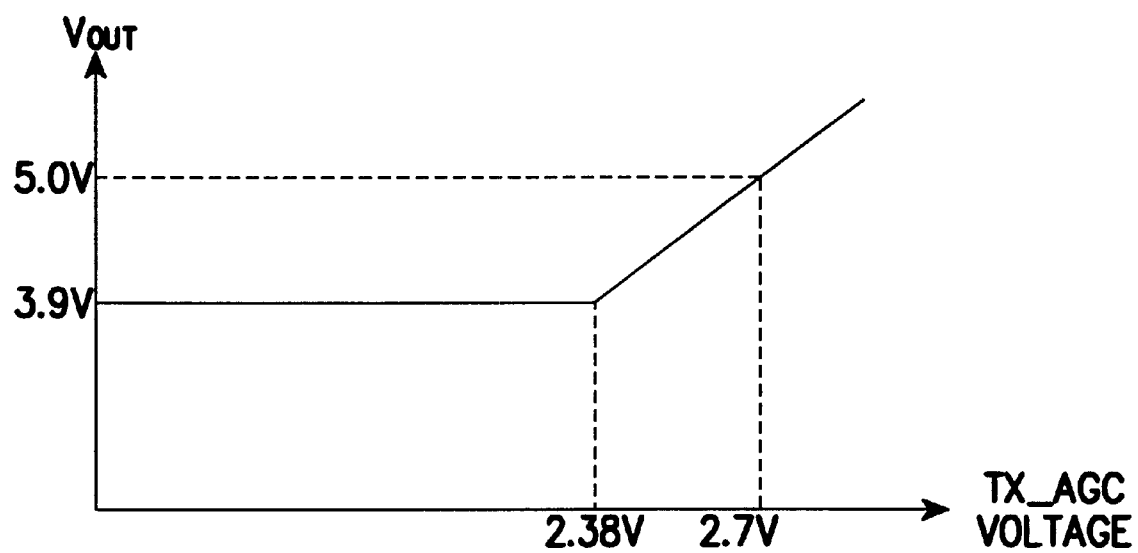

FIG. 4A is a chart illustrating a situation where the power supply apparatus of the present invention varies the output voltage $V_{OUT}$ of the DC/DC converter 20 according to a change in the transmission power. The TX_AGC voltage $V_{AGC}$ is used to detect the change in the transmission power. FIG. 4C is a chart illustrating a situation where the power supply apparatus varies the output voltage $V_{OUT}$ of the DC/DC converter 20 according to a change in the TX_AGC voltage $V_{AGC}$. As mentioned above, to control the output voltage $V_{OUT}$ of the DC/DC converter 20 with respect to the transmission power, the power supply apparatus uses the TX_AGC voltage $V_{AGC}$, and this TX_AGC voltage $V_{AGC}$ is determined by a baseband (B/B) chip 90 shown in FIG. 5.

Figure 5:
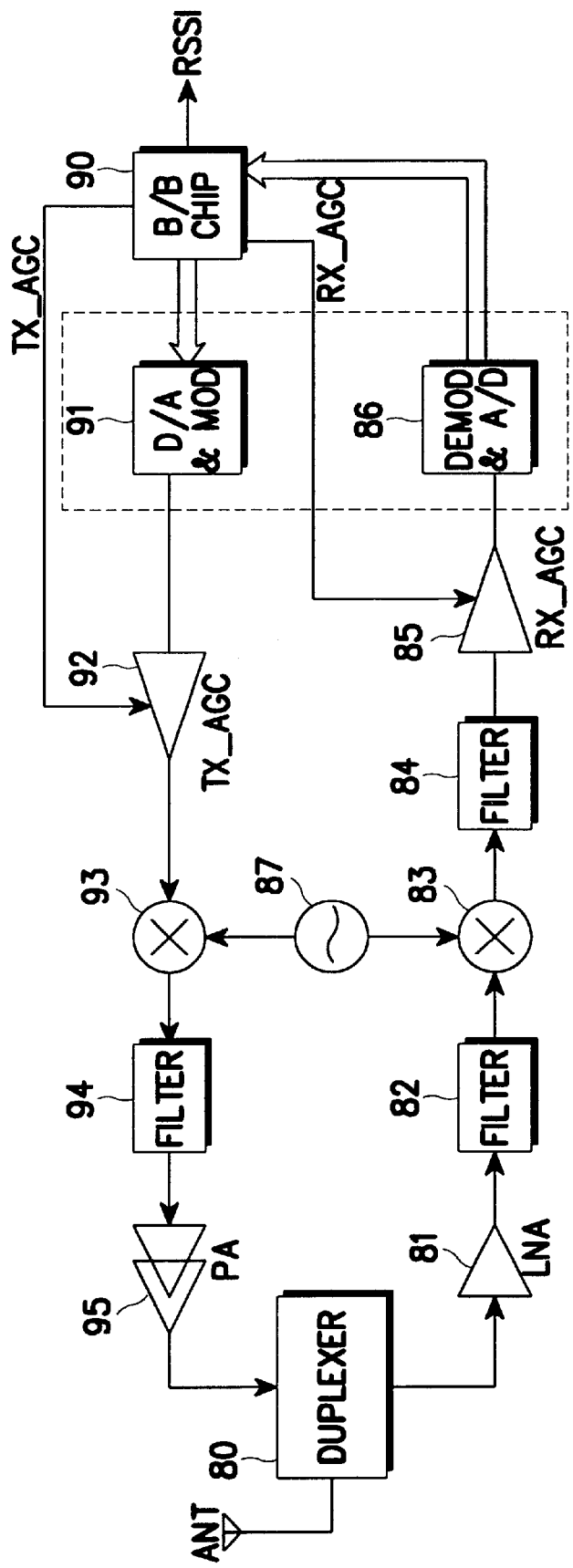
FIG. 5 is a schematic diagram illustrating a mobile communication terminal having the power supply apparatus of the present invention.

FIG. 5 is a schematic diagram illustrating an IS-95 CDMA communication terminal. A detailed description of the respective elements is avoided, but a description will now be given as to how the baseband chip 90 determines the TX_AGC voltage. In FIG. 5, the baseband chip 90 determines the TX_AGC voltage for controlling the transmission power and applies the determined TX_AGC voltage to a TX_AGC circuit 92. This power control operation may be divided into two operations. A first power control operation is an open loop power control operation which is performed in accessing a base station initially. In the open loop power control operation, the baseband chip 90 detects an RSSI (Received Signal Strength Indicator) value and determines a transmission power associated with the detected RSSI value. The relationship between the transmission power TX_POWER and the received power RX_POWER is given by the following equation:

$$TX\_POWER = -(RX\_POWER+73) \text{ [dBm]} \quad (9)$$

A second power control operation is a closed loop control operation which is performed after the terminal is connected to the base station by the first power control operation. In the closed loop control operation, the terminal receives a transmission power information command transferred from the base station and determines the TX_AGC voltage, in order to output the transmission power corresponding to the transmission power information command. As the TX_AGC voltage determined by the baseband chip 90 is applied to the voltage control current source 60, the power supply apparatus of the present invention adaptively supplies the DC voltage $V_{OUT}$ according to the transmission power, in the transmission mode.

As described above, the power supply apparatus in accordance with the present invention uses a single DC/DC converter 20 and adaptively varies the output voltage of the DC/DC converter 20 according to the transmission power in the transmission mode. Therefore, the power supply apparatus provides for a reduction in size of the mobile communication terminal and for a reduction in power loss of the voltage regulators and the power amplifier. Hence, power efficiency is maximized and the life of the battery is extended.

While the invention has been shown and described with reference to a certain preferred embodiment thereof, it will be understood by those skilled in the art that various changes in form and details may be made therein without departing from the spirit and scope of the invention as defined by the appended claims. For example, the voltage 3.9V in the reception mode and the voltage 3.9–5.0V in the transmission mode may be changed according to different types of mobile communication terminals, such as CDMA, GSM and FM (Frequency Modulation) communication terminals. Further, when a low-voltage battery is used, the down-converter may be replaced with an up-converter. Also, the transistor used for the voltage control current source may be replaced with any type of the switching element, such as a field effect transistor (FET).

What is claimed is:

1. A power supply apparatus for a mobile communication terminal capable of operating in a reception mode and in a transmission mode, the power supply apparatus comprising:

a DC/DC converter having at least one input lead and at least two output leads for converting a DC voltage supplied from a battery at the at least one input lead to a constant DC voltage and outputting the constant DC voltage to a first of the at least two output leads;

voltage control current means connected to the first of the at least two output leads for varying current flow according to a transmission AGC voltage in the transmission mode to adaptively vary an output voltage at a second of the at least two output leads of the DC/DC converter based on a transmission power; and a switch connected between the second of the at least two output leads of the DC/DC converter and a transmitter and a power amplifier, said switch being in a closed position during the transmission mode to transfer the output voltage of the DC/DC converter to the transmitter and the power amplifier.

2. The power supply apparatus according to claim 1, further comprising:

a first resistor connected between the first and second of the at least two output leads of the DC/DC converter; and a second resistor connected between the first of the at least two output leads of the DC/DC converter and ground.

3. The power supply apparatus according to claim 1, wherein said voltage control current means is a voltage control current source connected between the second of the at least two output leads and ground, and being in parallel with a second resistor.

4. The power supply apparatus according to claim 1, wherein said voltage control current means controls the current flow through a first resistor and a second resistor in parallel with said voltage control current means.

5. The power supply apparatus according to claim 1, further comprising voltage regulator means for regulating the output voltage of the DC/DC converter and supplying the regulated voltage to a receiver and baseband signal processor during the reception mode.

6. The power supply apparatus according to claim 5, wherein said voltage regulator means includes a first and a second voltage regulator each being connected to the receiver and baseband signal processor.

7. The power supply apparatus according to claim 1, further comprising a voltage regulator connected between the switch and the transmitter for regulating the output voltage of the DC/DC converter and supplying the regulated voltage to the transmitter during the transmission mode.

8. The power supply apparatus according to claim 1, wherein in the reception mode, said voltage control current means flows a first current through a first resistor to output a first output voltage at the second of the at least two output leads of the DC/DC converter determined by a DC voltage at the first of the at least two output leads of the DC/DC converter and a voltage drop across the first resistor, and further wherein in the transmission mode, said voltage control current means flows a second current equal to or greater than the first current through the first resistor to output a second output voltage at the second of the at least two output leads, said second output voltage being a variable voltage equal to or greater than the first output voltage.

9. The power supply apparatus according to claim 4, wherein said voltage control current means comprises:

an input end for receiving the transmission AGC voltage determined according to the transmission power; and a switching element which is turned on to form a current path between the first of the at least two output leads of the DC/DC converter and a ground when the transmission AGC voltage has a predetermined value, thereby increasing the current flowing through the first resistor.

10. The power supply apparatus according to claim 9, wherein said switching element is a transistor having a base connected to the input end, a collector connected to the first of the at least two output leads of the DC/DC converter and an emitter connected to ground.

11. The power supply apparatus according to claim 9, further comprising:

a resistor connected between the input end and the base of the switching element; and a resistor connected between the base and ground.

\* \* \* \* \*